United States Patent
Lorence

[15] 3,662,623
[45] May 16, 1972

[54] TURNTABLE DRIVE MECHANISM

[72] Inventor: Ervin W. Lorence, Cedarburg, Wis.

[73] Assignee: Lorence Manufacturing Corp., Milwaukee, Wis.

[22] Filed: Aug. 19, 1970

[21] Appl. No.: 65,014

[52] U.S. Cl............................................74/805, 212/69
[51] Int. Cl.......................................F16h 1/28, B66c 23/84
[58] Field of Search....................................212/69; 74/805

[56] References Cited

UNITED STATES PATENTS

| | | | |
|---|---|---|---|
| 3,452,624 | 7/1969 | Lorence | 212/69 X |
| 1,749,183 | 3/1930 | George | 212/69 |
| 2,990,726 | 7/1961 | McDonald | 74/805 X |
| 3,056,315 | 10/1962 | Mros | 74/805 |
| 3,029,955 | 4/1962 | Perkins | 212/69 |
| 3,255,840 | 6/1966 | Tangen | 74/805 X |

*Primary Examiner*—Leonard H. Gerin
*Attorney*—Andrus, Sceales, Starke & Sawall

[57] ABSTRACT

A turntable drive mechanism for heavy construction equipment including a base and a turntable which is mounted for rotation with respect to the base. A motor is mounted on the turntable and drives an eccentric which rotates within an opening in a floating gear unit. The floating gear unit includes a lower small diameter gear and an upper large diameter gear, with the small gear being engaged with a gear ring connected to the base, while the large gear is engaged with a gear ring connected to the turntable. Each gear has a lesser number of teeth than the corresponding gear ring and rotation of the gear unit provides a speed reduction to the turntable. The gear ring associated with the turntable is journalled within and upstanding peripheral flange formed on the base. The space between the turntable and the base serves as an oil reservoir, and to provide more effective lubrication, a series of passages are formed in the floating gear unit adjacent the teeth of the smaller gear and are directed toward the input drive gear. Engagement of the teeth of the smaller gear with the gear ring acts to pump oil through the passages and direct the oil toward the drive gear. An improved swivel coupling connection is provided for connecting the power lines on the rotating turntable to the power lines on the non-rotating base.

14 Claims, 7 Drawing Figures

PATENTED MAY 16 1972
3,662,623
SHEET 1 OF 2
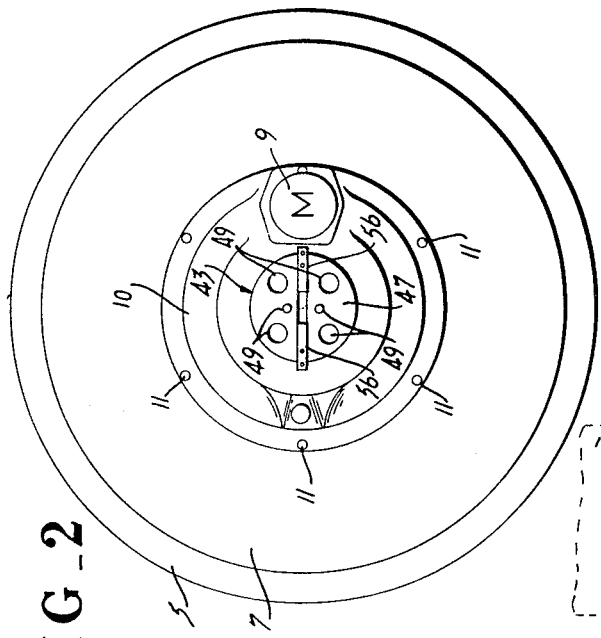
FIG_2
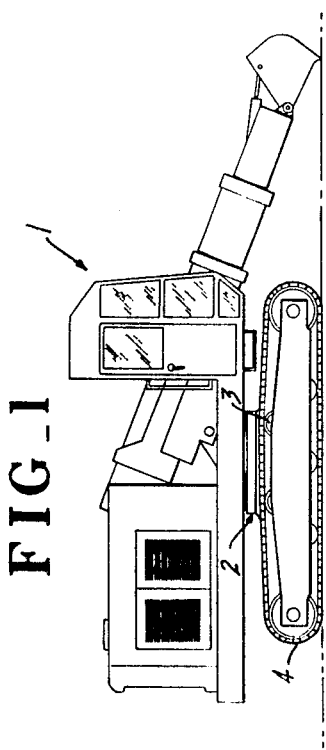
FIG_1
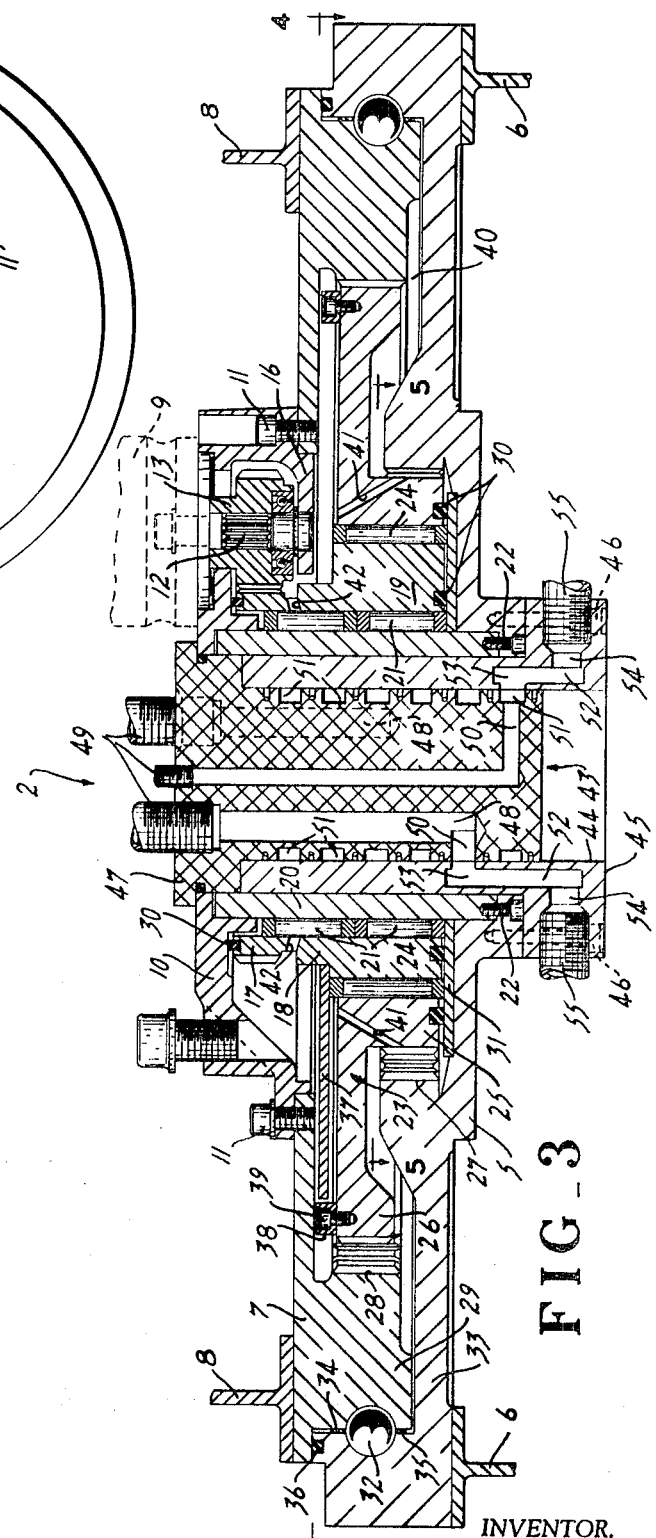
FIG_3
INVENTOR.
ERVIN W. LORENCE
BY
Andrus, Sceales, Starke & Sawall
Attorneys

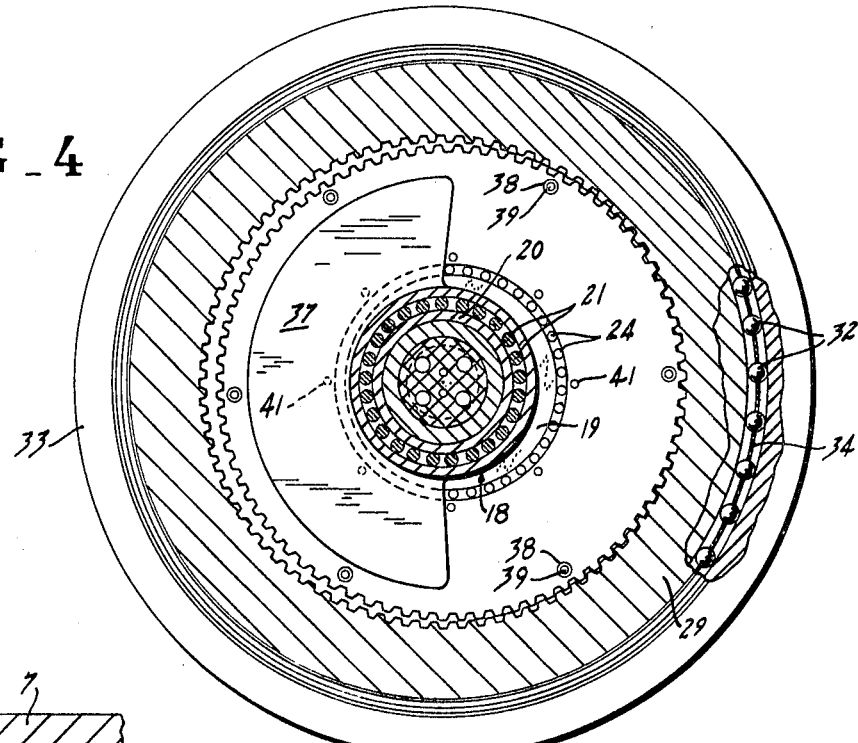
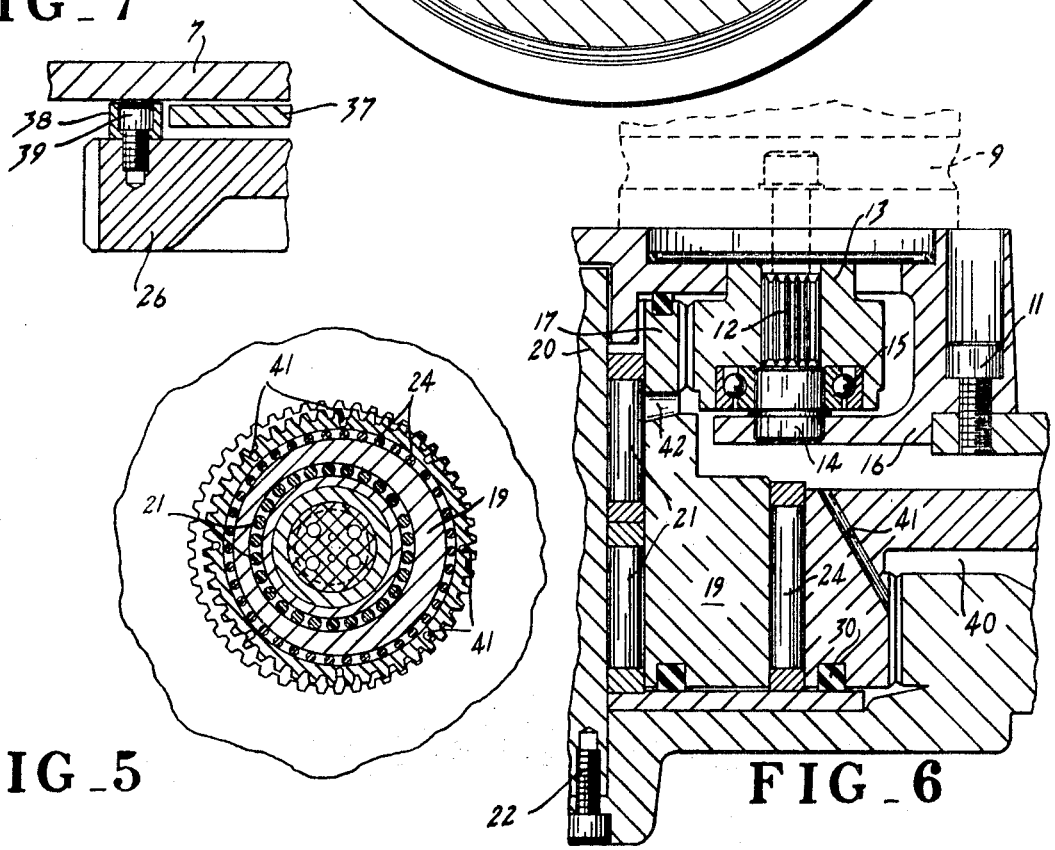

TURNTABLE DRIVE MECHANISM

This invention relates to a drive mechanism and more particularly to a turntable drive mechanism for backhoes, cranes and other heavy construction equipment.

In the past, turntables for heavy construction equipment, such as backhoes or cranes, have been driven by a motor acting through a gear train transmission. In order to drive the turntable at a relatively slow speed an expensive and complicated gear train is required in order to provide the necessary speed reduction. In order to eliminate the costly gear train it has also been proposed in the past to employ less costly hydraulic cylinders to rotate the turntable. However, hydraulic cylinders are capable of rotating the turntable only through a small arc and full 360° rotation cannot be obtained.

U.S. Pat. No. 3,369,672 relates to a turntable drive mechanism for heavy construction equipment which provides a 360° rotation and is substantially less costly and smaller in size than normal transmissions having the same reduction capacity. According to the drive mechanism of that patent, the hydraulic motor is mounted on a turntable and drives an eccentric which is journalled within a floating gear unit. The gear unit includes a pair of gears, a small diameter gear and a large diameter gear. The small diameter gear meshes with a gear ring formed on the turntable, while the large diameter gear meshes with a gear ring formed on the base or housing of the unit. Each gear in the floating gear unit has a lesser number of teeth than the corresponding gear ring, and as the eccentric is rotated, the large gear will be moved by a wedging action in the opposite direction and at a slower rate of speed to provide a first speed reduction and the smaller gear, which rotates with the larger gear, will be moved by a wedging action in the opposite direction to the larger gear and at a slower rate of speed to provide a second speed reduction to the turntable.

The present invention is directed to a turntable drive mechanism which is an improvement to that disclosed in the aforementioned U.S. Pat. No. 3,369,672. According to the invention, the floating gear unit includes a large diameter gear and a small diameter gear which is located beneath the larger gear and is engaged with a gear ring formed on the fixed base or housing, while the large gear is engaged with a gear ring formed on a depending flange connected to the turntable. Each gear has a lesser number of teeth than the corresponding gear ring, and rotation of the eccentric will drive the small gear in the opposite direction and at a slower rate of speed to provide a first speed reduction, and rotation of the large gear, which is integrally connected to the small gear, will drive the second gear ring and turntable in the opposite direction and at a slower rate of speed for a second speed reduction. According to the invention, the gear ring associated with the turntable is journalled for rotation in an upstanding peripheral flange formed on the base or housing by a series of ball bearings. As the base or housing comprises a reservoir for lubricating medium, such as oil, the upstanding flange on the base prevents leakage of the oil through the bearing assembly. The lubrication characteristics of the drive mechanism are also improved by virtue of a series of passages formed in the floating gear unit which extend upwardly from the teeth of the small gear and are directed towards the pinion on the motor drive shaft. As the teeth of the small gear engage the teeth of the gear ring the oil will be moved upwardly through the passages by a pumping action to thereby effectively lubricate the pinion which is normally located above the level of the oil in the reservoir.

An additional feature of the invention is the provision of a counterweight which acts to counterbalance the eccentric and floating gear unit. The counterweight is connected to the eccentric and extends outwardly between the large gear and the turntable. As the counterweight is connected to the eccentric and is thereby rotating at a different rate of speed than both the turntable and the large gear, a series of spacers are located between the large gear and the turntable which prevent deflection of the large gear under load and eliminate any possibility of the large gear contacting the counterweight under heavy load conditions.

The invention also includes an improved hydraulic coupling construction which serves to connect the hydraulic lines on the turntable with the hydraulic components located on the fixed base or tread in the case of a backhoe. In this construction, the base includes a central sleeve and the coupling assembly is removably attached within the sleeve. By removing and replacing the coupling assembly with a coupling assembly having a different port arrangement, any desired pattern of fluid flow can be achieved without the necessity of modifying or changing the construction of the drive mechanism itself. To prevent deflection of the sleeve under high loads the upper end of the sleeve is journalled for rotation within a flange attached to the turntable unit.

The apparatus of the invention provides an improved speed reducing transmission which is able to carry greater loads with less vibration than prior transmissions.

The drive mechanism has an improved lubricating system which prevents leakage of the lubricating fluid and acts to distribute oil to all of the moving parts of the mechanism.

The drive mechanism is versatile in that it can be readily converted to various types of construction equipment, and can be utilized with different hydraulic systems by employing a coupling assembly having the desired porting.

Other objects and advantages will appear in the course of the following description.

The drawings illustrate the best mode presently contemplated of carrying out the invention.

In the drawings:

FIG. 1 is a side elevation of a conventional backhoe employing the drive mechanism of the invention;

FIG. 2 is a plan view of the turntable;

FIG. 3 is a vertical section showing the turntable drive mechanism;

FIG. 4 is a section taken along line 4—4 of FIG. 3;

FIG. 5 is a section taken along line 5—5 of FIG. 3;

FIG. 6 is a fragmentary enlarged vertical section showing the drive pinion and lubricating passages; and FIG. 7 is an enlarged fragmentary vertical section showing the spacing bearings for preventing contact between the gear unit and the counter weight under load.

The drawings illustrate a conventional backhoe including a cab and engine unit 1 supported on a turntable drive assembly 2 that is mounted for rotation on a frame 3 or supporting structure. The frame 3 can be mounted on treads or crawlers 4, as illustrated in FIG. 1, or alternately can be mounted on the back of a vehicle, such as a truck.

The turntable drive assembly 2 includes a base or housing 5, which is supported on a series of beams 6 which constitute a portion of the frame 3. The turntable drive assembly also includes a rotatable turntable 7 which is supported by beams 8 which constitute a portion of the cab and engine unit 1.

The drive mechanism is best illustrated in FIG. 3 and includes a motor 9 which is mounted on a cover plate 10 that is secured by bolts 11 to the turntable 7. The motor drive shaft 12 extends downwardly through an opening in the cover plate 10 and carries the pinion 13. To prevent deflection of the pinion 13 under high loads, the lower end of the pinion is journalled about a bearing support 14 by a bearing assembly 15 that is mounted within a recess formed in the pinion. Bearing support 14 is secured within an opening in a horizontal flange 16 which is a portion of the cover plate 10. This construction provides additional support for the lower end of the motor drive shaft 12 and acts to prevent deflection of the pinion under loads.

Pinion 13 is engaged and drives a gear 17 which is located on the upper end of a sleeve 18. The lower portion of the sleeve 18 is provided with an eccentric 19. Sleeve 18 is mounted for rotation about an inner sleeve 20 by a series of bearings 21 and the lower end of the sleeve 20 is connected to the base 5 by a series of bolts 22.

The eccentric 19 is journalled within an opening in a floating gear unit 23 by bearings 24. As shown in FIG. 3, the floating gear unit includes a small diameter lower gear 25 and a large diameter upper gear 26 which are integrally connected.

The teeth of the lower gear 25 are adapted to engage the teeth on a gear ring 27 which is formed on the base 5, while the teeth on the larger upper gear 26 engage the teeth of a gear ring 28 formed on the annular flange 29 of the turntable 5. The teeth of the small gear 25 are identical in size and shape to the teeth of the gear ring 27 and are also identical in size and shape to the teeth of the larger gear 26 and the gear ring 28. There are a lesser number of teeth on the gear 25 than on the gear ring 27 and similarly, the gear 26 has a lesser number of teeth than the gear ring 28. The difference between the number of teeth between the gear 25 and the gear ring 27 is the same as the difference in the number of teeth between the gear 26 and the corresponding gear ring 28.

To aid in carrying the thrust loads, a series of thrust bearing rings 30 are associated with both the sleeve 18 and the floating gear unit 23. The bearing rings 30 have a generally square cross section and are made of a self-lubricating material, such as polytetrafluoroethylene (Teflon). As shown in FIG. 3, one bearing ring 30 is located in a recess in the upper end of the sleeve 18, and rides against the cover plate 10, while a second bearing ring 30 is located within a recess in the lower end of the sleeve and rides on a thrust plate 31 secured to the base 5. A third bearing ring 30 is located within a recess formed in the bottom surface of the floating gear unit 23 and also rides on plate 31.

The outer edge of the turntable is journalled for rotation by a series of ball bearings 32 which are located within grooves formed in the flange 29 of the turntable and the upstanding peripheral flange 33 on the base 5. A spacing strip 34 is located within the clearance 35 between the flanges 29 and 33 and is provided with a series of spaced openings which receive the ball bearings 32. To seal the joint between the turntable 7 and the base 5, a sealing ring 36 is located within a recess formed in the upper surface of the flange 33 and bears against the undersurface of the turntable.

While the turntable and base are shown to be single members, it is contemplated that in practice, the turntable and base may be composed of a number of interconnected elements to facilitate fabrication or assembly.

Due to the substantial diameter of the turntable and the heavy loads encountered, the bearing structure provided by the ball bearings 32 located between the flanges 29 and 33 resists deflection of the turntable.

To counterbalance the off-center rotation of the eccentric 19 and floating gear unit 23, a counterweight 37 is secured to the sleeve 18 above the eccentric and extends outwardly between the turntable 7 and the floating gear unit 23. As best illustrated in FIG. 4, the counterweight is generally semi-circular in shape, extending through an arc of about 180°, and is located diametrically opposite the nose or extension of the eccentric 19. During operation, the counterweight 37, the floating gear unit 23, and the turntable, are all rotating at different speeds and to prevent direct contact between the rotating members due to deflection under heavy loads, a series of bearings 38 are mounted on the upper surface of the larger gear 26 by studs 39. During operation, the upper surface of the bearings 38 will be spaced slightly beneath the turntable 7 and, if under heavy load conditions, there is some deflection of the gear unit 23, the turntable will ride against the bearings 38 so that the counterweight will not contact either the turntable or the upper gear 26.

In operation, the motor drive shaft 12 drives the pinion 13 which in turn drives the sleeve 18 and eccentric 19. As the eccentric rotates within the opening in the gear unit 23, the gear unit is moved at a reduced speed in the opposite direction of rotation of the eccentric 19 by a wedging type of action. Thus, a speed reduction is provided between the input shaft and the gear unit 23.

As the gear unit rotates, engagement of the large upper gear 26 with the gear ring 28 will drive the gear ring 28 and the turntable 7 in the opposite direction of rotation of the gear unit 23 and at a reduced speed to provide a second speed reduction. This results in the turntable being driven at a relatively low speed generally in the range of 4 to 6 rpm.

The drive mechanism is a sealed unit and incorporates an improved lubrication system. The interior of the housing or base 5 comprises a reservoir 40 for a lubricating medium, such as oil, and in practice, the level of the oil will generally be slightly above the lower end of the teeth of the upper or larger gear 26. To provide lubrication for the pinion 13, a series of diagonal passages 41 are formed in the small gear 25 and extend upwardly from the teeth of the small gear to the upper surface of the gear unit 23 and are directed toward the pinion 13 and toward the teeth on the gear 17. During rotation of the gear unit 23, the planetary movement of the gear 25 with respect to gear ring 27, will cause the oil from the reservoir to be squeezed out from between the engaging teeth and be directed upwardly through the passages 41 toward the pinion 13 and the gear 17 to lubricate these parts. In addition, the sleeve 18 is provided with a series of passages 42, and oil dripping from the gear 17 or the pinion 13 can flow downwardly through the passages 42 and through the bearings 21 to lubricate the bearings as well.

The invention also has an improved construction for connecting the hydraulic lines to the rotating turntable. In this regard, a hydraulic coupling assembly 43 is removably mounted within the sleeve 18 and the coupling assembly includes an outer sleeve 44 having a lower mounting flange 45 which is connected to the base 5 by a series of bolts 46. In addition to the outer sleeve 44, the coupling assembly 43 includes a rotatable inner member 47 which is located within the outer sleeve and is connected to the turntable 7.

As shown in FIG. 3, the inner member 47 is provided with a series of vertical passages 48 and the drawings show six passages 48. A hydraulic fluid supply line 49 is connected to the upper end of each of the passages 48 and serves to supply hydraulic fluid or oil to the passages. The lower end of each of the passages 48 is connected by a horizontal passage 50 to a peripheral groove 51 which extends around the periphery of the inner sleeve 47. The number of grooves 51 corresponds to the number of passages 48 so that oil will be supplied to each of the grooves 51.

The outer sleeve 44 is also provided with a series of vertical passages 52 and the upper end of each passage 52 is connected by a port 53 to the inner surface of the sleeve 44, so that each port 53 registers with one of the grooves 51 in the inner member 47. The lower end of each vertical passage 52 is connected to an outlet 54, and a hydraulic line 55 is connected to each outlet. Hydraulic lines 55 can be connected to outriggers for a backhoe, or to hydraulic motors for endless treads if the backhoe is mounted on treads rather than on a truck body.

With the construction of the coupling assembly, each groove or recess 51 will be in continuous communication with the corresponding port 53 in the outer sleeve as the inner sleeve rotates so that oil will be continuously supplied to the lines 55 during rotation of the turntable.

The inner member 47 is secured to the cover plate 10 by means of a pair of keys 56 which are secured within aligned slots in the upper surface of the member 47 and in cover plate 10.

The coupling assembly 43 can be readily installed and removed from the drive mechanism. To install the coupling assembly, the outer sleeve 44 is inserted within the sleeve 18 and secured to the base by the bolts 46. The inner sleeve 47 is then inserted within the outer sleeve and attached to the turntable. The hydraulic flow system can be readily changed, depending on the particular application and the number of hydraulic lines required, by removing the coupling assembly 43 and installing another coupling assembly having the desired flow pattern. Thus, the hydraulic system can be changed as desired without any alteration or modification of the drive mechanism itself.

The turntable drive mechanism of the invention provides a full 360° rotation and can be used with any type of a mechanism such as a crane, backhoe, shovel, or the like. The drive mechanism can produce a high reduction in speed with a minimum number of moving parts and is substantially less costly and smaller in size than conventional units having the same reduction capacity.

The drive mechanism has an improved lubrication system which minimizes leakage of the lubricating medium through the bearing assemblies and automatically lubricates the gears which are located above the level of the lubricating medium in the reservoir.

The use of the counterweight balances the eccentric rotation and reduces vibration of the unit.

Various modes of carryang out the invention are contemplated as being within the scope of the following claims particularly pointing out and distinctly claiming the subject matter which is regarded as the invention.

I claim:

1. In an apparatus having a rotatable working member, turntable means to support the working member and disposed to rotate about an axis, an eccentric, drive means for rotating the eccentric, a floating gear unit having a central opening to rotatably receive the eccentric and including a first gear and a second gear, a fixed base including a fixed first gear ring disposed in engagement with said first gear, said first gear ring having a greater number of teeth than the first gear, a second gear ring secured to the turntable means and engaged with the second gear, said second gear ring having a greater number of teeth than said second gear, upstanding flange means extending upwardly from the periphery of the base and spaced radially outward of the second gear ring, bearing means disposed between said flange means and said turntable means for journalling the turntable means for rotation with respect to the base, the space between said turntable means and said base comprising a reservoir for a lubricating medium, said floating gear unit being provided with at least one passage extending from a level beneath the level of the lubricating medium in said reservoir to a level above the level of the lubricating medium in the reservoir for distributing the medium to the upper portion of the reservoir during rotation of said gear unit.

2. The apparatus of claim 1, wherein said drive means comprises a hydraulic motor mounted on the turntable means, a drive shaft connected to the motor and extending downwardly through an opening in said turntable means, and gear means interconnecting the drive shaft with said eccentric to rotate said eccentric.

3. The apparatus of claim 1, wherein said second gear has a larger diameter than the first gear and said first gear is located beneath said second gear, said passage extends from adjacent the teeth of the first gear to the upper surface of the floating gear unit, whereby engagement of the teeth of the first gear with the first gear ring acts to pump the lubricating medium upwardly through said passage to the upper portion of the reservoir.

4. The apparatus of claim 3, wherein said drive means includes a drive gear located in the upper portion of the reservoir and disposed in alignment with said passage, whereby lubricating medium being pumped upwardly through said passage will contact said drive gear to lubricate the same.

5. The apparatus of claim 1, and including an annular thrust bearing ring mounted in a groove in said floating gear unit, and a wear plate associated with the base, said bearing ring disposed to rotate in contact with said wear plate.

6. The apparatus of claim 5, wherein said bearing ring has a generally rectangular cross section and is formed of polytetrafluoroethylene.

7. In an apparatus having a rotatable working element, turntable means to support the working element and disposed to rotate, a first sleeve having an eccentric surface, a fixed second sleeve located within the first sleeve with the first sleeve being mounted for rotation on said second sleeve, drive means mounted on the turntable means and operably connected to the first sleeve for rotating the eccentric, a gear unit having a central opening to rotatably receive the eccentric and including a first small diameter gear and a second large diameter gear, a fixed base including a fixed first gear ring disposed in engagement with the small diameter gear, said first gear ring having a greater number of teeth than the teeth of the small gear, a second gear ring secured to the turntable means and engaged with the larger diameter gear, said second gear ring having a greater number of teeth than said large diameter gear, rotation of said eccentric causing rotation of said gear unit to provide a two-stage speed reduction to said turntable means, and a coupling assembly removably secured within said second sleeve, said coupling assembly including a tubular member connected to said base and to said second sleeve and a rotatable member located within said tubular member and connected to said turntable means, said members having interconnecting passages arranged to be in continuous communication as the turntable means and the rotatable member rotate relative to the base and the tubular member.

8. The apparatus of claim 7, wherein one end of said second sleeve is connected to said base and said apparatus includes an inwardly extending annular flange on said turntable means, said flange being rotatably disposed around the opposite end of said second sleeve to prevent deflection of said opposite end.

9. The apparatus of claim 7, wherein said members are arranged to be removably inserted into opposite ends of said second sleeve.

10. In an apparatus having a rotatable working member, turntable means to support the working member and disposed to rotate about an axis, an eccentric, drive means for rotating the eccentric, a floating gear unit having a central opening to rotatably receive the eccentric and including a large diameter gear and a small diameter gear, said small diameter gear being located beneath the large diameter gear, a fixed base including a fixed first gear ring disposed in engagement with the small diameter gear, said first gear ring having a greater number of teeth than the teeth of the small gear, a second gear ring secured to the turntable means and engaged with the larger diameter gear, said second gear ring having a greater number of teeth than said large diameter gear, upstanding flange means extending upwardly from the periphery of the base and spaced radially outward of the second gear ring, bearing means disposed between said flange means and said turntable means for journalling the turntable means for rotation with respect to said base, and counterweight means connected to the eccentric and extending outwardly therefrom, said counterweight means located between said turntable means and said floating gear unit.

11. The apparatus of claim 10, wherein said counterweight means is located diametrically opposite the large diameter portion of said eccentric.

12. The apparatus of claim 10, and including spacing means located in the space between the turntable means and the floating gear unit for preventing contact between said gear unit and the counterweight means due to deflection under heavy load.

13. The apparatus of claim 12, wherein said spacing means comprises a series of circularly spaced bearing members located radially outward of said counterweight means.

14. The apparatus of claim 13, wherein the bearing members are secured to the floating gear unit and under no-load conditions are spaced out of contact with the turntable means.

* * * * *